April 1, 1958 T. L. DIMOND 2,829,320
ENCAPSULATION FOR ELECTRICAL COMPONENTS AND METHOD OF MANUFACTURE
Filed Jan. 12, 1955
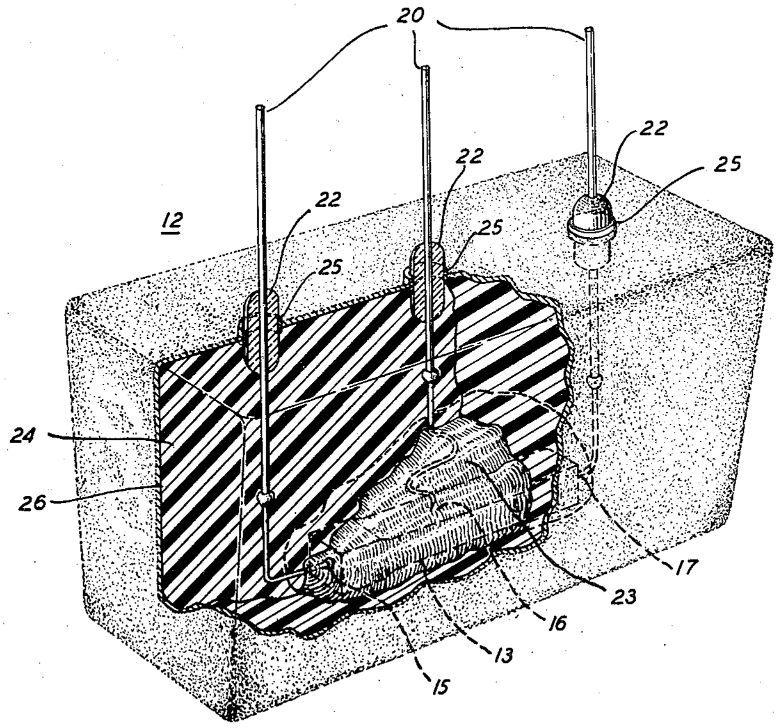
INVENTOR
T. L. DIMOND
BY D. H. Wilson, Jr.
ATTORNEY

United States Patent Office 2,829,320

Patented Apr. 1, 1958

2,829,320

ENCAPSULATION FOR ELECTRICAL COMPONENTS AND METHOD OF MANUFACTURE

Thomas L. Dimond, Rutherford, N. J., assignor to Bell Telephone Laboratories, Incorporated, New York, N. Y., a corporation of New York Application January 12, 1955, Serial No. 481,311

6 Claims. (Cl. 317—234)

This invention relates to electrical components and more particularly to electrical components encompassed by a resinous body, and to methods of manufacture of such devices.

Severe degradation of the electrical characteristics of unprotected electrical components has frequently been noted following the exposure of their surfaces to environments containing certain substances. The problem of finding appropriate means for providing a hermetic seal against moisture and other detrimental substances which may initiate deterioration of their electrical qualities has been of major concern in the fabrication of almost all circuit elements which are built to give reliable performance over a long period of time. Heretofore, device reliability over long intervals has required complex protective structures including coatings of materials such as plastics or waxes, and housings which seal the entire unit in glass or metal envelopes. The development in the past few years of casting resins of superior quality has, in general, greatly altered the aspects of encapsulation, particularly in connection with application to the housing of electrical components such as semiconductive devices where fabrication has been notably facilitated. One form of resin encapsulated semiconductive device of the type to which this invention pertains is disclosed in Patent No. 2,688,110 of J. V. Domaleski, E. L. Gartland and J. J. Kleimack, issued August 31, 1954. While cast resinous housings are known to have a large number of advantageous features and casting resins with suitable electrical and physical properties are readily available, the problem to date has been that no organic encapsulating material can be found which is permanently impervious to all detrimental constituents of the device environment and particularly to water vapor.

It is accordingly the principal object of the present invention to prevent deterioration of the operating characteristics of electrical components and more particularly to protect electrical devices with a novel housing. More specific objects of this invention are to facilitate the fabrication of a moisture impervious housing for electrical components, to increase the reliable performance lifetime of the component, and to increase markedly the chemical stability of such devices.

In one illustrative embodiment of this invention, a transistor-type semiconductive translator is encapsulated in a protective encompassing housing. Glass bushings, each having a metallic band sealed to and surrounding it, are hermetically sealed about the electrical lead-in wires extending from the device. A resinous body which may be a casting material surrounds and envelops the translator and embeds, to the level of the metal bands encircling them, the glass bushing sealed about each lead. The final hermetically sealed protective coating is a continuous adherent metallic film covering the resinous body and a portion of the metal bands surrounding the insulating glass bushings on the electrical leads.

In accordance with one feature of this invention, a continuous, adherent, moisture impervious layer of metal following the contours of the underlying structure is deposited on the resin encapsulated component.

In accordance with another feature of this invention, each lead wire from the electrical component passes through a sealed-on glass bushing having a circular metallic band bonded around it, each glass bushing being partially embedded in the resinous structure and so arranged that a lower portion is below the surface of the resin and a peripheral portion of the metal band which surrounds each bushing is in contact therewith.

More particularly, in accordance with a further feature of this invention, a continuous layer of protective metal is deposited on the resin encapsulated structure in such a manner that the adherent metal coating covers the entire resin surface and overlaps the metal band of the glass bushing on each electrical lead-in wire, thereby providing a continuous protective barrier of either metal or glass which houses the electrical component.

The invention and the above noted and other objects and features thereof will be understood more clearly and fully from the following description when read with reference to the accompanying drawing showing a perspective view, partially broken away, of a moisture impervious housing for a semiconductive translating device illustrative of one embodiment of this invention.

Referring now to the drawing, the figure shows a protective housing 12 for an electrical component which in this illustrative case comprises a three-electrode semiconductive translating device. The semiconductive body 13 may be a small bar of single crystal germanium or silicon containing a thin layer of p-type interposed between regions of n-type. Mechanically strong ohmic contacts are made to three regions by electrodes which are designated emitter 15, base 16, and collector 17. To these electrodes are bonded electrical lead-in wires 20, each having a glass bushing 22 sealed about it. Alternatively, it may in some instances be suitable to connect a lead-in wire directly to the electrical component rather than to an electrode which contacts the component. It is understood that the lead-in wires 20 advantageously may be of a material having a coefficient of thermal expansion very near to that of the glass employed for bushings 22.

Following connection of the electrical lead-in wires 20 to the electrodes 15, 16 and 17 which make contact with the semiconductive body 13, it may be desirable to render additional mechanical protection by applying an enclosing globule of soft resilient gel material 23 which covers the semiconductive body and a portion of the electrodes. A quick drying vinyl resin lacquer forms a tough elastic shell around the gel which should be a material which remains soft at any operating temperature to which the device is to be subjected.

The entire assembly is then encapsulated in a resinous body 24, which by way of example may be a styrene polyester compound or a thermosetting epoxy resin such as "Araldite." The resin is applied so that it completely encompasses the semiconductive translator and partially embeds the glass bushings 22 which are sealed about the electrical lead-in wires 20. In the illustrative unit each glass bushing is embedded in the resinous body 24 to the level of the seamless metallic band 25 sealed to and surrounding it, whereby a lower peripheral portion of each metallic band is on or below the surface of the resinous body.

Permanent protection against moisture and other detrimental substances, which may initiate deterioration of electrical properties of the device, is attained by depositing on the surface of the resin encapsulated semiconductive translator a continuous adherent metallic film 26. Methods of application of the adherent layer of metal include the well-known techniques of pyrolytic and cataphoretic deposition, evaporation distillation of a metal in vacuum and deposition by cathode disintegration. It may also in some instances be desirable to electroplate over the primary metallic layer. The protective film of metal 26 follows the contours of the underlying resinous structure and completely covers the encapsulated component except for the projecting portion of the partially embedded glass bushings about each conductive lead-in wire. It is continuous and seamless and therefore its reliability, simplicity and economy offer substantial advantage over those can-type housings of the prior art employing sealed seams. Electrical insulation of the leads is not impaired since the exposed portion of the bushings can be masked during deposition of the metal coating. In a preferred embodiment and as depicted in the figure, the metallic film which covers the resinous body is bonded to metal bands which are sealed about each insulator bushing and the protective housing obtained is one wherein a continuous barrier of either metal or glass which is permanently impervious to all detrimental constituents of the device environment surrounds the semiconductive translator.

While the invention has been described above as applied to semiconductive devices it is to be understood that it is not so limited. It is equally suitable for other electrical components, particularly in applications where electrical components are easily damaged by environmental constituents such as water vapor.

Although specific embodiments of the invention have been shown and described, it will be understood that they are but illustrative and that various modifications may be made in the above-described process for hermetically sealing the electrical components without departing from the scope and spirit of this invention.

What is claimed is:

1. In a device including a semiconductive translator having conductive leads in electrical contact therewith, and extending outwardly therefrom, a housing comprising glass bushings hermetically sealed about said leads, a seamless metallic band sealed to and surrounding a restricted portion of each of said bushings, a resinous body which completely encompasses the semiconductive translator and partially embeds the glass bushings sealed to said leads, and a continuous adherent metallic coating covering said resinous body and bonded to the metallic bands surrounding said glass bushings.

2. In a device including an electrical component having at least one conductive lead extending away from a point of electrical contact therewith, an air-tight moisture impervious housing comprising a glass bushing sealed about the lead, a seamless metallic band sealed to and surrounding said glass bushing, a quantity of resinous material which envelops said component and has surfaces which are bonded to a part of said glass bushing on its side toward said point of contact, and an adherent protective metallic film continuously surrounding said resinous material, said metallic film being bonded to the metallic band surrounding said glass bushing and spaced from said lead.

3. In an electrical component having conductive leads extending away from respective points of contact therewith, a protective housing comprising glass bushings hermetically sealed about said leads, a resinous body which completely envelops said component and a portion of said bushings, seamless metallic bands in spaced relation with the respective leads bonded to and surrounding said bushings and in contact with said resinous body, a cavity in said resinous body which contains at least a portion of said component and said conductive leads and a soft protective material for said component which fills the cavity, and a seamless, continuous, adherent, metallic film coating said resinous body and bonded to said metallic bands surrounding said glass bushings.

4. A housing for an electrical component comprising a continuous resinous body encompassing said component, lead-in wires extending from said component through the resinous body to the exterior, moisture impervious insulating bushings sealed about said lead-in wires and partially embedded in the resinous body, seamless metal bands sealed to and surrounding the partially embedded bushings in spaced relation with the lead-in wires extending through said bushings, said bands having a lower peripheral portion contacting the surface of the enveloping resinous body, and a continuous adherent metallic film covering said resinous body and bonded to a peripheral portion of the metal bands surrounding said bushings and being spaced from said lead-in wires.

5. The method of hermetically sealing an electrical component which comprises sealing a glass bushing about a conductive lead-in wire, sealing a metal band around a restricted portion of said bushing in spaced relation with the lead-in wire extending through said bushing, connecting said lead-in wire to an electrode of the electrical component, applying an insulating encapsulating material to said component to form a body through which said lead-in wire extends to the exterior, partially embedding said glass bushing in said encapsulating material, masking a portion of said bushing intermediate its periphery and said lead-in wire, and depositing a continuous adherent metallic film on said encapsulating material and the entire periphery of said metal band encircling said glass bushing.

6. The method of hermetically sealing an electrical component which comprises sealing bushings of moisture impervious, electrical insulating material about conductive lead-in wires, sealing a metallic band around a restricted portion of each of said bushings in spaced relation with the lead-in wires extending through each bushing, connecting said lead-in wires to electrodes of said electrical component, encapsulating the component in a resinous body through which said lead-in wires extend to the exterior, embedding said bushings in said resinous body to the level of the metallic bands encircling said bushings, and depositing a continuous adherent metallic film on the resinous body and a peripheral portion of the metallic bands on said bushings.

References Cited in the file of this patent

UNITED STATES PATENTS

| | | |
|---|---|---|
| 1,354,146 | Thomas | Sept. 28, 1920 |
| 1,843,622 | Norton | Feb. 2, 1932 |
| 1,938,857 | Pickard | Dec. 12, 1933 |
| 2,688,110 | Domaleski et al. | Aug. 31, 1954 |
| 2,704,340 | Baird | Mar. 15, 1955 |

OTHER REFERENCES

Slade, Abstract Ser. No. 223,547, published September 8, 1953.